(12) United States Patent
Shi et al.

(10) Patent No.: US 8,126,103 B2
(45) Date of Patent: Feb. 28, 2012

(54) FRAME SYNCHRONIZATION USING CORRELATION BETWEEN PERMUTED SEQUENCES

(75) Inventors: Miao Shi, Kearny, NJ (US); Yeheskel Bar-Ness, Marlboro, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1008 days.

(21) Appl. No.: 12/001,463

(22) Filed: Dec. 11, 2007

(65) Prior Publication Data
US 2008/0165910 A1 Jul. 10, 2008

Related U.S. Application Data

(60) Provisional application No. 60/874,141, filed on Dec. 11, 2006.

(51) Int. Cl.
*H04L 7/00* (2006.01)
(52) U.S. Cl. ........ 375/366; 375/260; 375/340; 375/354; 375/365; 375/367; 375/368; 370/509; 370/510
(58) Field of Classification Search .......... 375/260, 375/340, 354, 365, 366, 367, 368; 370/509, 370/510
See application file for complete search history.

(56) References Cited

U.S. PATENT DOCUMENTS

| | | | | |
|---|---|---|---|---|
| 5,339,337 | A * | 8/1994 | Levine | 375/366 |
| 6,625,463 | B1 * | 9/2003 | Xiao et al. | 455/502 |
| 7,430,262 | B2 * | 9/2008 | Forte | 375/367 |
| 2006/0050799 | A1 * | 3/2006 | Hou et al. | 375/260 |

FOREIGN PATENT DOCUMENTS

| | | |
|---|---|---|
| DE | 10341546 | 1/2005 |
| WO | WO 00/59147 | 10/2000 |
| WO | WO 2006/015108 | 2/2006 |

OTHER PUBLICATIONS

International Preliminary Report on Patentability for PCT/IB2007/004055, issued Jun. 16, 2009.
International Search Report for PCT/IB2007/004055 dated Jun. 19, 2008.
Chevillat, P.R. et al., "Rapid Training of a Voiceband Data-Modem Receiver Employing an Equalizer with Fractional-T Spaced Coefficients", *IEEE Transactions on Communications*, vol. Com-35, No. 9, pp. 869-876, Sep. 1987.
Choi, Z. Y. and Y. H. Lee, "On the Use of Double Correlation for Frame Sychronization in the Presence of Frequency Offset", *IEEE*, pp. 958-962, 1999.
Miao, Shi et al., "A Novel Frame Synchronization Method Using Correlation Between Permuted Sequences" Wireless Communications and Networking Conference, 2007, IEEE, pp. 2448-2453, Mar. 2007.

(Continued)

*Primary Examiner* — Leon Flores

(57) ABSTRACT

A permuted sequences combination uses a frame structure in which two sync words, each comprising M complex symbols, are appended at the frame start. One benefit is the reduction of the large variance of the timing estimation error in the conventional correlation method. In at least one embodiment, the first sync word, $\vec{s}_1$, is a predetermined constant amplitude zero autocorrelation (CAZAC) sequence. The second sync word, $\vec{s}_2$, is a permutation of the first such that the combination of the two received sync signal vectors perform sliding window processing where the peak occurs at the correct frame start. The permuted sequences combination can be used in both AWGN channel and multi-path environments.

11 Claims, 4 Drawing Sheets

OTHER PUBLICATIONS

Minn, H. et al., "A Simple and Efficient Timing Offset Estimation for OFDM Systems," 2000 IEEE $51^{st}$. Vehicular Technology Conference Proceedings. Tokyo, Japan, May 15-18, 2000; IEEE, US, vol. Conf. 51, May 15, 2000.

Minn, H. et al., "On Timing Offset Estimation for OFDM Systems", *IEEE Communications Letters*, vol. 4, No. 7, pp. 242-244, Jul. 2000.

Modulo Multiplication Group, URL http://www.mathworld.wolfram.com/ModuloMultiplicationGroup.html, last visited Mar. 13, 2008.

Park, B. et al., "A Novel Timing Estimation Method for OFDM Systems", *IEEE Communications Letters*, vol. 7, No. 5, pp. 239-241, May 2003.

"Part 11: Wireless LAN Medium Access Control (MAC) and Physical Layer (PHY) specifications: High-Speed Speed Physical Layer in the 5 GHZ Band", *IEEE Std 802.11a-1999*, Sep. 16, 1999.

Permutation Matrix, URL: http://mathworld.wolfram.com/PermutationMatrix.html, last visited Mar. 13, 2008.

Schmidl, T. M. and D. C. Cox, "Robust Frequency and Timing Synchronization for OFDM", *IEEE Transactions on Communications*, vol. 45, No. 12, pp. 1613-1621, Dec. 1997.

Scholtz, R. A., "Frame Synchronization Techniques", *IEEE Transactions on Communications*, vol. Com-28, No. 8, pp. 1204-1213, Aug. 1980.

Van De Beek, J-J et al., "ML Estimation of Time and Frequency Offset in OFDM Systems", *IEEE Transactions on Signal Processing*, vol. 45, No. 7, pp. 1800-1805, Jul. 1997.

Examination Report on Great Britain application 0911877.9, dated Feb. 24, 2011.

\* cited by examiner

FRAME SYNCHRONIZATION USING CORRELATION BETWEEN PERMUTED SEQUENCES

CROSS-REFERENCE TO RELATED PATENT APPLICATIONS

The present application claims priority to U.S. Provisional Application Ser. No. 60/874,141 entitled "Method and System for Frame Synchronization Using Correlation Between Permuted Sequences" filed on Dec. 11, 2006, and incorporated herein by reference in its entirety.

FIELD

The present application relates to the filed of time estimation in communication systems. More specifically, it relates to frame synchronization using correlation between permuted sequences.

BACKGROUND

Frame synchronization is important in digital communications. Heretofore, various approaches have been proposed to conduct frame synchronization. Specifically in orthogonal frequency division multiplexing (OFDM) systems, a conventional correlation method appends cyclic periodic training sequences at the start of the data frame at the transmitter and, at the receiver, the periodicity of the signals within an observation window is explored to obtain frame synchronization. In IEEE 802.11a and IEEE 802.16g standards, for example, the preambles contain two (or more) identical sync words of M symbols. Only M complex multiplications are needed for each timing estimate. However, when the timing offset is less than M samples (M is the period of the training sequence), the frame synchronization metric is not narrow around its peak that corresponds to the correct timing start. When the signal-to-noise ratio (SNR) is not high enough, the probability of coarse synchronization error (timing estimate errors within the length of the training sequence) is high.

A number of techniques have been proposed to sharpen the timing metric and thus reduce the variance of the timing estimation error. For example, a different sync words have been used to minimize coarse timing synchronization errors, specifically in OFDM. In a double correlation technique for MPSK systems, the nonlinear Bessel function is approximated by a second order power series, resulted in estimate which approaches the maximum likelihood (ML) solution of the frame start in the presence of the frequency offset. The complexity of this method, however, is high, requiring about $M^2$ complex multiplications for each timing estimate. Other frame synchronization techniques have been proposed. However, prior systems and methods fail to show or suggest a permuted sequences combination for frame synchronization such as described in the present application.

SUMMARY

According to one aspect described in the present application, a first sync word $\vec{s}_1$ is a predetermined constant amplitude zero autocorrelation (CAZAC) sequence, while the second $\vec{s}_2$, which is the permutation of the first sync word, is obtained in such a way that the permutation matrix $\gamma$ is a sparse matrix of order M having ones only at the (i,k)th component if $$(i-1)p + q \stackrel{\mathrm{mod}M}{=} k-1,$$

where p and q are integers less than M. According to the specific permutation used in the design of $\vec{s}_2$, the combination of two received signal vectors creates sliding window processing, resulting in a peak that occurs at the correct start of a frame. The permuted sequences combination described can perform well in AWGN channels and multi-path channels.

According to another aspect described in the present application, a method for synchronizing a communication signal with a frame structure and each frame of the frame structure includes at least one symbol, includes receiving a first synchronization word in a first sequence of a communication signal. The first synchronization word provides a reference symbol. The method further includes receiving a second synchronization word in a second sequence of the communication signal where the second synchronization word is a permutation of the first synchronization word.

According to yet another aspect described in the present application, an apparatus synchronizes a communication signal having a frame structure using correlations between permuted sequences. The apparatus includes a modulator and a transmitter. The modulator provides a first synchronization word in a first sequence of a communication signal and a second synchronization word in a second sequence of the communication signal. The second synchronization word is a permutation of the first synchronization word. The transmitter transmits the communication signal including the first and second synchronization words.

According to yet still another aspect described in the present application, a method of frame synchronization using permuted sequences includes receiving a communication signal at a receiver where the communication signal including a frame structure with a first frame having a first communication word and a second frame having a second communication word. The method further includes de-permuting the first communication word from the received communication signal and performing a correlation of the first communication word and the second communication word.

These and other features, aspects and advantages of the present invention will become apparent from the following description, appended claims, and the accompanying exemplary embodiments shown in the drawings, which are briefly described below.

DETAILED DESCRIPTION

Exemplary embodiments are described below with reference to the accompanying drawings. It should be understood that the following description is intended to describe exemplary embodiments of the invention, and not to limit the invention.

Frame synchronization techniques can be divided into two groups: a data-aided and a non-data aided, or blind synchronization. In general, the latter technique may require complicated computation and its performance is usually worse than the former. The former technique may require an extra small percent of bandwidth, however, it is much simpler to implement and hence is widely accepted in industry. In this paper, we will focus on the former: data-aided frame synchronization schemes, specifically, for those whose frame structures have two successive sync words.

Figure 1:
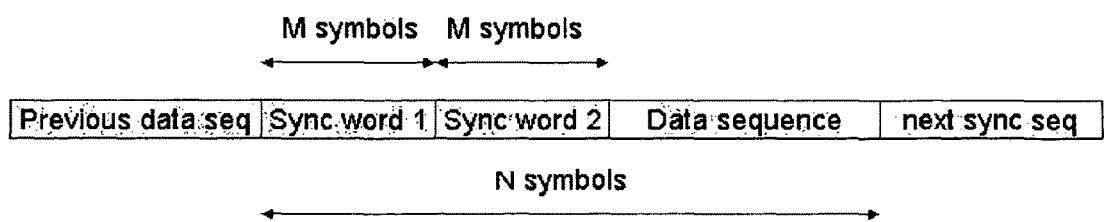
FIG. 1 is a graphical representation of an example frame structure.

FIG. 1 illustrates a frame structure 10 for a frame used in data-aided frame synchronization. While the case of modulation using the AWGN (additive white Gaussian noise) channel with only timing offset is used for illustration purposes, other modulation schemes can also be used. Considering the frame structure shown in FIG. 1, the first 2M symbols are the sync pattern. ($2M \leq N$). The transmitted signal, $$x(n) = \begin{cases} s_1(n), & 0 \leq n \bmod N < M \\ s_2(n), & M \leq n \bmod N < 2M \\ d(n) & 2M \leq n \bmod N < N \end{cases} \quad (1)$$

where $s_1(n)$ and $s_2(n)$ has power $\sigma_s^2 \cdot \sigma_s^2$ is the transmitted signal power.

In the AWGN case where only timing offset, $\tau$, is an unknown random parameter, the received signal can be written as $$r(n) = x(n-\tau) + w(n) \quad (2)$$

With the two identical sync words $\vec{s}_1$ and $\vec{s}_2$ used to detect the frame start, the timing metric for the start position, $\hat{\tau}$ is given by $$\hat{\tau} = \underset{i=[-M, N-M+1]}{\mathrm{argmax}} |\vec{r}_i^H \vec{r}_{i+M}| \quad (3)$$

where $\vec{r}_i$ is the received signal vector of length M starting from the ith sample; $(\cdot)^H$ represents the Hermitian operator. The above estimator in (3) depends on only the correlation term related to the sync pattern as compared to other solutions which may also include the auto-correlation term of the received signal in the timing metric.

Assuming that the noise at the receiver is AWGN and the data symbols are randomly distributed with mean zero, then $E[|\vec{r}_i^H \vec{r}_{i+M}|]$ for $i=\mu$ is the expectation of the sliding correlation of the two successively received vectors as a function of the frame start with timing estimate error $\mu$, given by $0 < \mu = |\hat{\tau} - \tau| \leq M$. As such, $E[|\vec{r}_i^H \vec{r}_{i+M}|_{i=0}]$ represents the expectation of the sliding correlation of the two successively received vectors without a timing error. The difference of these two can be rewritten as $$E[|\vec{r}_i^H \vec{r}_{i+M}|_{i=\mu} - |\vec{r}_i^H \vec{r}_{i+M}|_{i=0}] = \left|\vec{s}_1^H T_\mu T_\mu^H \vec{s}_2 - \sum_{i=1}^{\mu} s_1^*(i) s_2(i)\right| - |\vec{s}_1^H \vec{s}_2| \quad (4)$$

$T_\mu$ is a circulant matrix whose first column is the $\mu$th column of the identity matrix. When the SNR is high, equation (4) can be approximated as $$E[|\vec{r}_i^H \vec{r}_{i+M}|_{i=\mu} - |\vec{r}_i^H \vec{r}_{i+M}|_{i=0}] \leq \left|\sum_{i=1}^{\mu} s_1^*(i) s_2(i)\right| \quad (5)$$

if $$T_\mu T_\mu^H = I \quad (6)$$

The expectation of the difference of the sliding correlation of the two successive received sync words only depends on $$\left|\sum_{i=1}^{\mu} s_1^*(i) s_2(i)\right|,$$

which is when $\vec{s}_1 = \vec{s}_2$, equals to $\mu \sigma_s^2$. Using a length shift register sequence (m-sequence) of length 63 (M=63) as the sync word, the average value of the timing metric (3) over 1000 symbols of the conventional correlation methods in both QPSK (quadrature phase shift keying) on OFDM (orthogonal frequency division multiplexing) systems and QPSK (single carrier) systems have been plotted in FIG. 2a and FIG. 2b when SNR=10 dB. The expectation of the timing metric is not narrow around the correct timing offset and hence the timing estimation error has large variance, resulting in large coarse synchronization errors.

From equation (4), it can be seen that the quality of a sync word can depend on several parameters. To maximize the difference of the value of the timing metric between $\mu=0$ and $0<\mu\leq M$, a linear frame synchronization or permuted sequences combination method can be used. In such a method, $\vec{s}_2$ is a permuted (interleaved) version of $\vec{s}_1$. Correspondingly, at the receiver, de-permute $\vec{s}_2$ is de-permute and the correlation of the two sync words is taken.

Denote $\otimes$ as an permuted sequences combination operator where $$\vec{s}_1 \otimes_{\vec{s}_2} = \vec{s}_1^H \gamma \vec{s}_2 \quad (7)$$

γ is a permutation matrix given by $$\gamma = [e_{\gamma_0} \ldots e_{\gamma_{M-1}}]^T \quad (8)$$

$e_i$ is the ith row of the identity matrix. The subscript $[\gamma_0 \ldots \gamma_{M-1}]$ is given by $$[\gamma_0 \ldots \gamma_{M-1}]^T = \gamma[0 \ldots M-1]^T \quad (9)$$

Note that when the sync word $\vec{s}_1$ and $\vec{s}_2$ are composed of real symbols, we can drop the conjugate operator in (7).

When γ=I, the identity matrix;

$$\vec{s}_1 \otimes \vec{s}_2 = \vec{s}_1^H \vec{s}_2 \quad (10)$$

$$= [s_1(0) \ldots s_1(M-1)]^* \begin{bmatrix} s_2(0) \\ \vdots \\ s_2(M-1) \end{bmatrix}$$

Also, assuming that the sync words $\vec{s}_1$ and the permuted $\vec{s}_2$ have fixed signal energy $M\sigma_s^2$, then in order to have the largest combination, the two sync words vectors should have the same components as the case in the conventional method. Support for this proposition is described below with reference to Equations (25) through (29). Specifically, the largest combination $M\sigma_s^2$ occurs at μ=0 if the sync word $\vec{s}_2$ is given by $$\vec{s}_2 = \gamma^T \vec{s}_1 \quad (11)$$

where $\gamma^T$ is the transpose of the permutation matrix and also the inverse permutation matrix. In fact, if the second sync word $\vec{s}_2$ is designed according to (11), then from (7), assuming the noise is small compared with the signal, the expectation of the sliding correlation of the two successively received vectors without a timing error is $$E[|\vec{r}_i \otimes \vec{r}_{i+M}|_{i=0}] = |\vec{s}_1 \otimes \vec{s}_2| = \vec{s}_1^H \gamma \vec{s}_2 = \vec{s}_1^H \gamma \gamma^T \vec{s}_1 = \vec{s}_1^H \vec{s}_1 \quad (12)$$

since $$\gamma\gamma^T = I \quad (13)$$

Consequently, assuming that M is large and μ is small in comparison to M then ignoring the second term on the RHS of (4), (4) is reduced to $$E[|\vec{r}_i^H \vec{r}_{i+M}|_{i=\mu} - |\vec{r}_i^H \vec{r}_{i+M}|_{i=0}] = \left| \vec{s}_1^H T_\mu T_\mu^H \vec{s}_2 - \sum_{i=1}^{\mu} s_1^*(i)s_2(i) \right| - |\vec{s}_1^H \vec{s}_2| \quad (14)$$

Now a good timing metric should have a delta like timing metric, which means the first term on the RHS of (14) has the following property given by $$\vec{s}_1^H T_\mu \otimes T_\mu^H \gamma^\nu \vec{s}_1 = \begin{cases} M\sigma_s^2, & \mu = 0 \\ 0, & M \geq |\mu| > 0 \end{cases} \quad (15)$$

By the definition of, the left hand side (LHS) of (15) can be rewritten as $$\vec{s}_1^H T_\mu \otimes T_\mu^H \gamma^T \vec{s}_1 = \vec{s}_1^H T_\mu^T \gamma T_\mu \gamma^T \vec{s}_1 \quad (16)$$

And when μ=0, $T_\mu = I$, it follows that $$\vec{s}_1^H T_\mu^T \otimes T_\mu \gamma^T \vec{s}_1 = \vec{s}_1^H \vec{s}_1 \quad (17)$$

Note that the RHS of (17) equals to the modular square of the sync word $\vec{s}_1$.

It is notable that there are some special sequences (for example, CAZAC sequence, m-sequence) with a delta like auto-correlation satisfying the property $$\vec{s}_1^H T_\mu \vec{s}_1 = \begin{cases} M\sigma_s^2, & \mu = 0 \\ 0 \text{ or } -1, & M \geq |\mu| > 0 \end{cases} \quad (18)$$

By employing such sequences, it is possible to design only the permutation to make the LHS of (15) circulant auto-correlations of the sync word $\vec{s}_1$. Thus, using such sequences, the permutation matrix γ is chosen to satisfy $$T_\mu^T \gamma T_\mu \gamma^T = T_\nu, \nu \neq 0 \quad (19)$$

ν is an integer.

For this, a specific permutation matrix of order M is introduced whose (i,k)th component is given by $$\gamma(i, k) = \begin{cases} 0, & (i-1)p + q \stackrel{\text{mod} M}{\neq} k - 1 \\ 1, & (i-1)p + q \stackrel{\text{mod} M}{=} k - 1 \end{cases} \quad (20)$$

$$gcd(p, M) = 1 \quad (21)$$

i.e. p is relatively prime to M·gcd(·) represents the greatest common divisor. q is a given integer that can be selected from [0 ... M−1]. For example, when M=5, p=3, q=0, the permutation matrix defined by (20) can be given by $$\gamma = \begin{bmatrix} 1 & 0 & 0 & 0 & 0 \\ 0 & 0 & 0 & 1 & 0 \\ 0 & 1 & 0 & 0 & 0 \\ 0 & 0 & 0 & 0 & 1 \\ 0 & 0 & 1 & 0 & 0 \end{bmatrix} \quad (22)$$

Combining (6) and (19):

$$\gamma T_\mu \gamma^T = T_{\mu+\nu}, \nu \neq 0 \quad (23)$$

As shown in the description below accompanying Equations (30) through (41), when using the permutation matrix γ given by (20), and in order to satisfy (23), (p−1) should be relatively prime to M, where p is the multiplicative inverse of p in the finite filed of $$M \left( \text{i.e. } pp \stackrel{\text{mod} M}{=} 1 \right).$$

Figure 2:
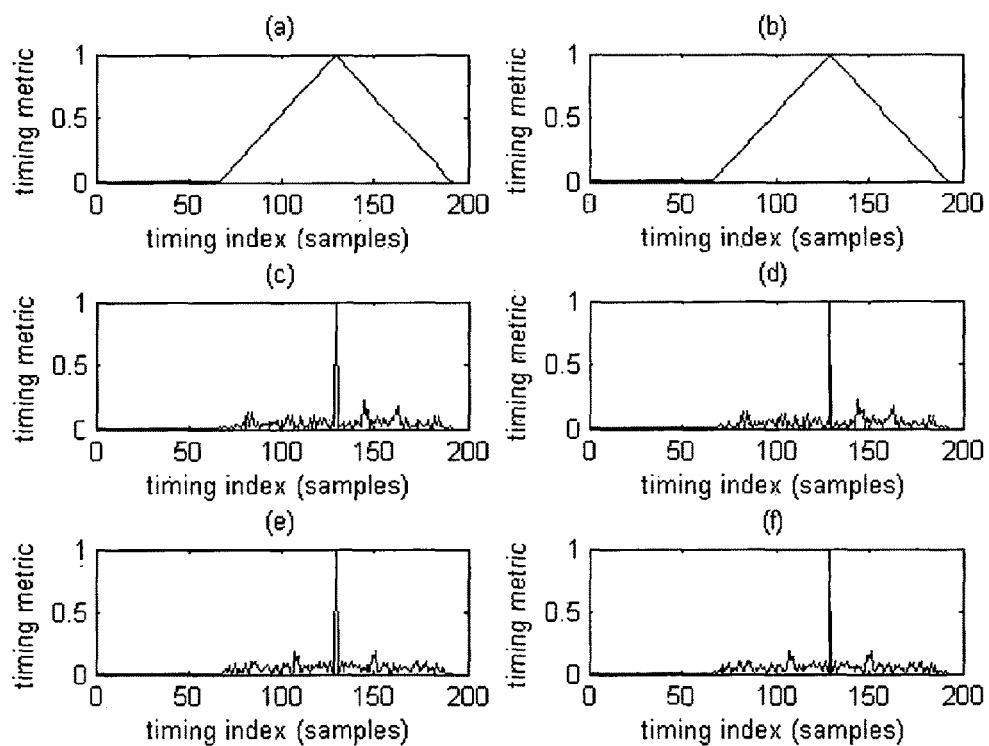
FIG. 2(a) is a graph showing the average timing metric over 1000 symbols with a conventional QPSK OFDM scheme.
FIG. 2(b) is a graph showing the average timing metric over 1000 symbols with a conventional QPSK scheme.
FIG. 2(c) is a graph showing the average timing metric over 1000 symbols with a QPSK OFDM permuted sequences scheme.
FIG. 2(d) is a graph showing the average timing metric over 1000 symbols with a QPSK single carrier permuted sequences scheme.
FIG. 2(e) is a graph showing the average timing metric over 1000 symbols with a QPSK OFDM symmetric sequences scheme.
FIG. 2(f) is a graph showing the average timing metric over 1000 symbols with a QPSK single carrier symmetric sequences scheme.

Simulations were conducted to verify the above results. Using, for example, a m-sequence of length 63 as the sync word, the permutation matrix is given by (20) when q=0, p=2. The average value of the timing metric of the permuted sequences combination methods in QPSK on OFDM systems and QPSK (single carrier) systems have been plotted when SNR=10 dB. As it is shown in FIG. 2*c* and FIG. 2*d*, the expectation of the timing metric is a delta like function around the correct timing position.

One can show that, when p=M−1 and q=M−1, the second sync word is the reverse version of the first sync word $\vec{s}_1$, and hence form a symmetric sync pattern with the first sync word.

Taking the example in the above, when p=4, q=4, the permutation matrix can be given by $$\gamma = \begin{bmatrix} 0 & 0 & 0 & 0 & 1 \\ 0 & 0 & 0 & 1 & 0 \\ 0 & 0 & 1 & 0 & 0 \\ 0 & 1 & 0 & 0 & 0 \\ 1 & 0 & 0 & 0 & 0 \end{bmatrix} \quad (24)$$

Figure 3:
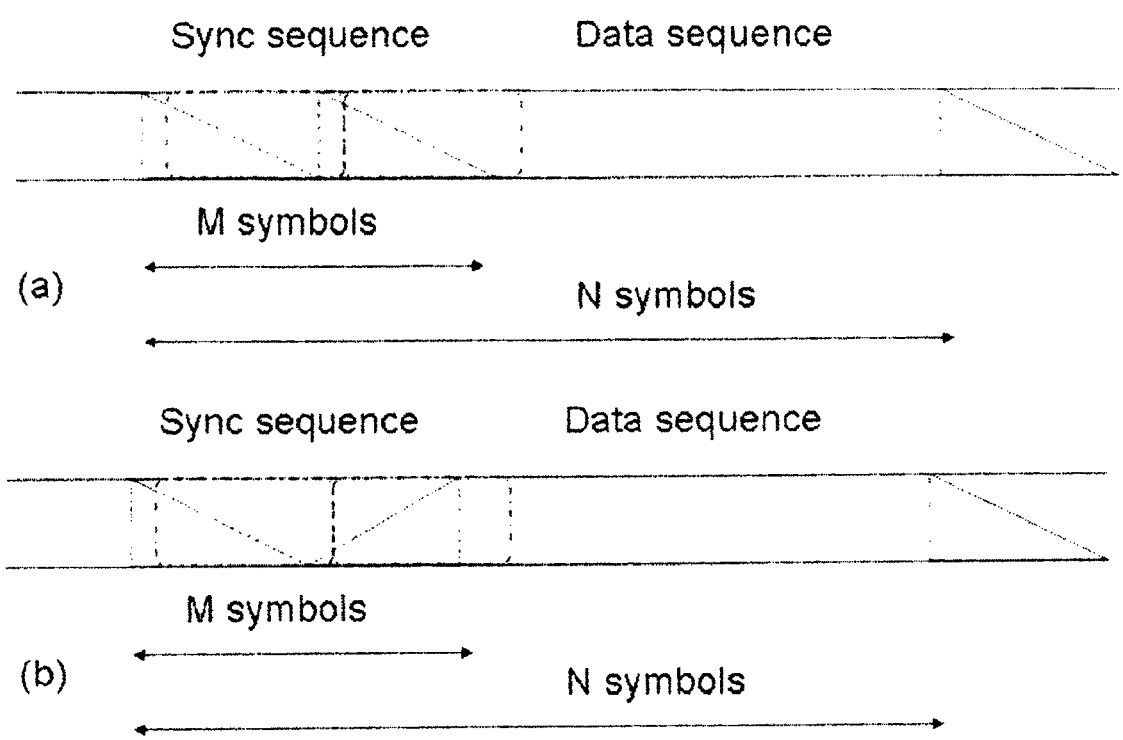
FIG. 3(a) is a graphical representation of a conventional sync pattern.
FIG. 3(b) is a graphical representation of a symmetric sync pattern.

The above permutation matrix can give rise to a symmetric permutation. This scheme can be referred to as a symmetric correlation method. Indeed, symmetric correlation demonstrates the symmetry between the two received sync words (FIG. 3(b)) instead of the similarity of the two sync words (FIG. 3(a)). Using the triangle as the sync word, in FIG. 3(a), the two sync words still have a large part of similarity when $0 < \mu \leq M-1$. While in FIG. 3(b), the two sync words do not maintain such similarity even when there is a small timing shift. As one embodiment of permuted sequences combination method, the symmetric correlation method is also robust to the frequency offset. While in the permuted sequences combination method, the estimator of timing offset is also a function of the frequency offset.

In simulation with the symmetric correlation method, for m-sequence of length 63, (M=63) as shown in FIG. 2(e) and FIG. 2(f), the expectation of the timing metric is similar to the permuted sequences combination method given by FIG. 2(c) and FIG. 2(d) for QPSK on OFDM and single carrier respectively.

Figure 4:
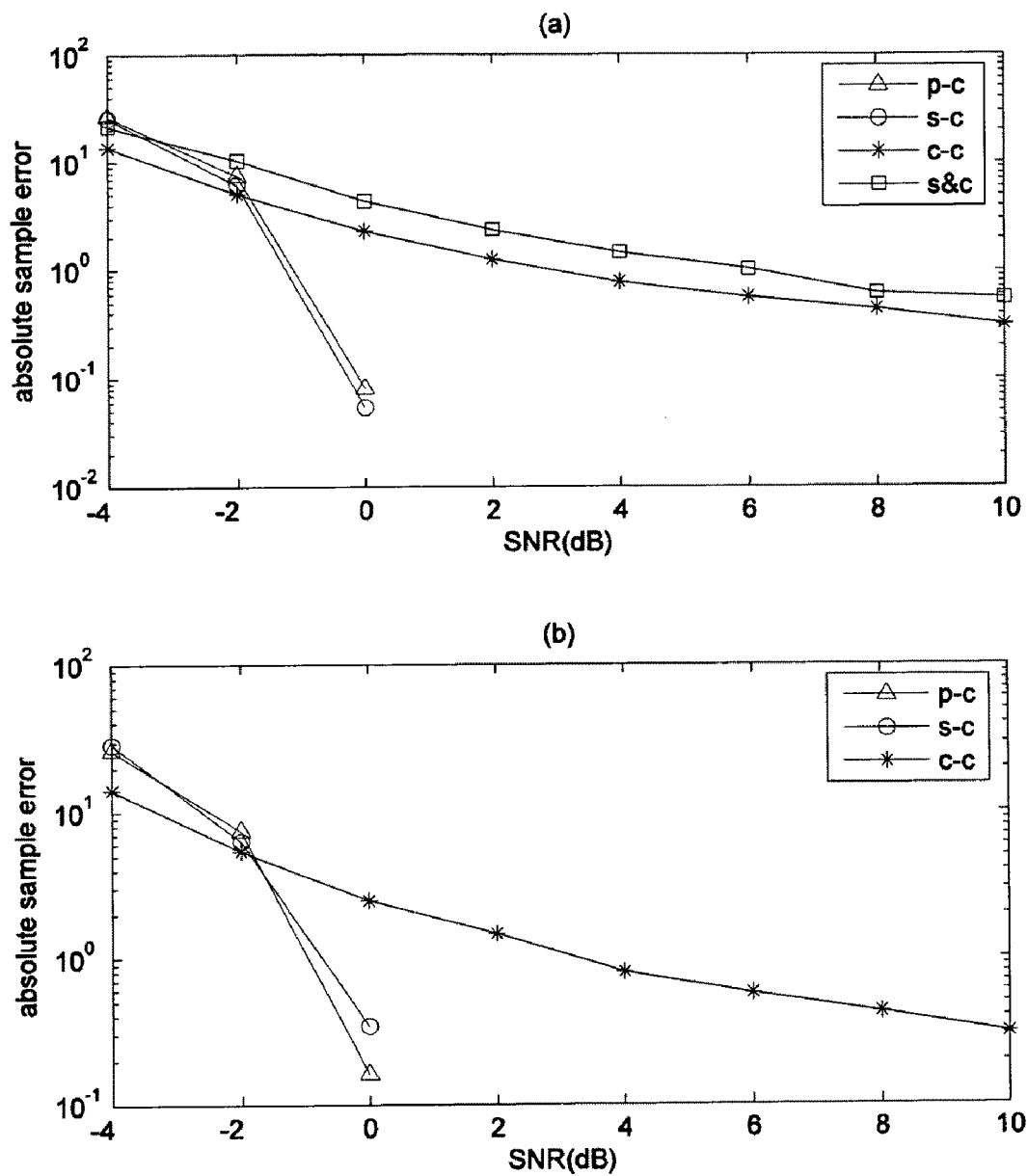
FIG. 4(a) is a graph comparing the absolute sample error of a permuted combination where q=0, p=2, a symmetric correlation, and a conventional correlation scheme (s&c) at different SNRs for AWGN (additive white Gaussian noise) channels in a QPSK on OFDM system.
FIG. 4(b) is a graph comparing the absolute sample error of the permuted combination where q=0, p=2, a symmetric correlation, and a conventional correlation scheme (s&c) at different SNRs for AWGN channels in a QRSK single carrier system.
Figure 5:
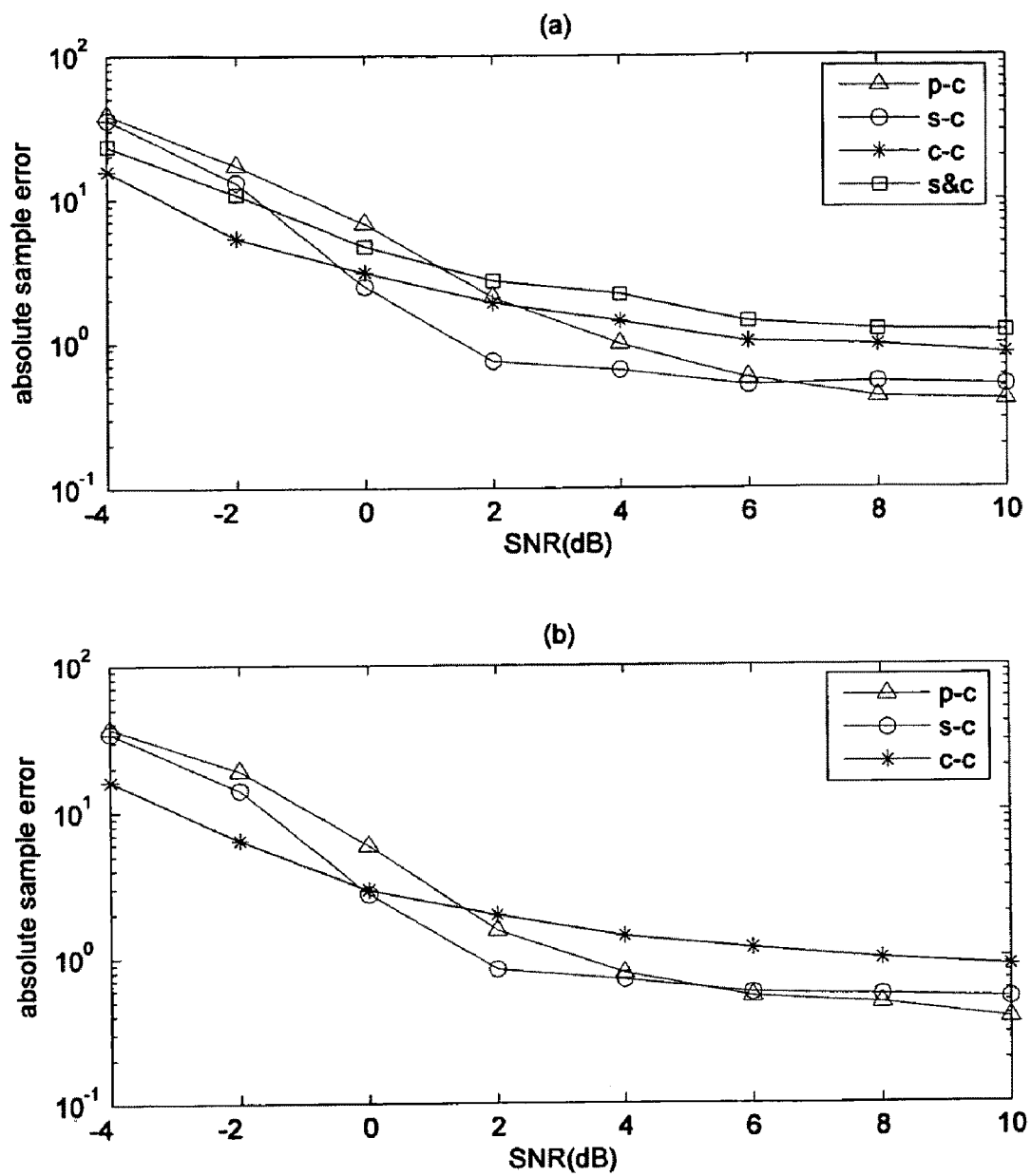
FIG. 5(a) is a graph comparing the absolute sample error of a permuted combination where q=0, p=2, a symmetric correlation, and the conventional correlation scheme (s&c) at different SNRs for fading channels in QPSK on OFDM.
FIG. 5(b) is a graph comparing the absolute sample error of a permuted combination where q=0, p=2, a symmetric correlation, and the conventional correlation scheme (s&c) at different SNRs for fading channels in a QRSK single carrier system.

FIG. 4 and FIG. 5 illustrate simulation results showing the performance of the permuted sequences combination method "p-c" (with q=0, p=2), and the symmetric correlation method "s-c" in comparison with the conventional correlation method "c-c". Also shown is a performance comparison to a method proposed by Schmidl and Cox (s&c) (based on the combination of the cross and auto-correlation). In these simulations, the timing offset used was 49. In FIG. 4(a) and FIG. 4(b), an AWGN channel is applied with QPSK on OFDM (FFT size was 64, CP=16) and QPSK on single carrier. In FIG. 5(a) and FIG. 5(b), Rayleigh fading channels are applied in which there were three channel taps inside CP (the variance of the three channel taps are 1, 0.16, and 0.02 respectively), again with QPSK on OFDM and QPSK on single carrier respectively.

From the results, it can be seen that with AWGN, the permuted sequences combination method and the symmetric correlation method have similar performance. Both methods outperform the conventional correlation method, especially at SNRs greater than −2 dB. For the fading channels above, the permuted sequence combination and symmetric correlation methods still outperform the conventional method. Performance may depend on the power of the taps of the fading multipath.

As mentioned above, sync words $\vec{s}_1$ and $\vec{s}_2$ have the same components. The sync words $\vec{s}_1$ and $\vec{s}_2$ have constant amplitudes and signal power $M\sigma_s^2$. That is, $$\|\vec{s}_1\| = \|\vec{s}_2\| = M\sigma_s^2 = \sum_{i=1}^{M-1} |s_1(i)|^2 = \sum_{i=1}^{M-1} |s_2(i)|^2 \quad (25)$$

According to (7), the permuted sequences combination of $\vec{s}_1$ and $\vec{s}_2$ is given by $$\vec{s}_1 \otimes \vec{s}_2 = \sum_{i=0}^{M-1} s_1^*(i) s_2(\gamma_i) \quad (26)$$

combining (25) and (26), we have $$\|\vec{s}_1\| = \|\vec{s}_2\| \quad (27)$$
$$= 2M\sigma_s^2$$
$$= \sum_{i=1}^{M-1} |s_1(i)|^2 + \sum_{i=1}^{M-1} |s_2(i)|^2 - 2\sum_{i=0}^{M-1} s_1^*(i)s_2(\gamma_i) + 2\vec{s}_1 \otimes \vec{s}_2$$

Note that the LHS of (27) is a constant, in order to maximize the last term on the RHS of (27), the first term should be minimized, that is the component of and should be the same. Specifically, the largest permuted sequences combination occurs when $$s_1(i) = s_2(\gamma_i) \quad (28)$$

Or, writing in matrix notation, $$\vec{s}_1 = \gamma \vec{s}_2 \quad (29)$$

As mentioned above, for $\gamma T_\mu \gamma^T$ to equal $T_{\mu+\nu}$, $\nu \neq 0$, (p−1) must be relatively prime to M. Since that $T_{\mu+\nu}$ is a circulant matrix, it can be fully diagonalized by Fast Fourier Transform (FFT) and Inverse Fast Fourier Transform (IFFT) matrix. Accordingly, for $\gamma T_\mu \gamma^T = T_{\mu+\nu}$ it follows that:

$$F\gamma\gamma^H F T_\mu F^H F \gamma^T F^H = F T_{\mu+\nu} F^H, \nu \neq 0 \quad (30)$$

Then using the diagnalization property of circulant matrix, (30) can be rewritten as $$F\gamma\gamma^H \Lambda_\mu F\gamma^T F^H = \Lambda_{\mu+\nu}, \nu \neq 0 \quad (31)$$

F is the FFT matrix given by $$F = \begin{bmatrix} 1 & 1 & \cdots & 1 \\ 1 & \omega & \cdots & \omega^{M-1} \\ \vdots & \vdots & \vdots & \vdots \\ 1 & \omega^{M-1} & \cdots & \omega^{(M-1)^2} \end{bmatrix} \quad (32)$$

where $$\omega = \exp(-j2\pi/M) \quad (33)$$

$\Lambda_i$ is a diagonal matrix whose diagonal elements are given by $$\Lambda_i(k,k) = \omega^{i(k-1)}, k=1, \ldots, M \quad (34)$$

From (20) and (32), we can get for M=5, p=3, q=1, after mathematical manipulation, $F\gamma\gamma^H$ is given by $$F\gamma\gamma^H = \begin{bmatrix} 1 & 0 & 0 & 0 & 0 \\ 0 & 0 & \varpi^{-2} & 0 & 0 \\ 0 & 0 & 0 & 0 & \varpi^{-4} \\ 0 & \varpi^{-1} & 0 & 0 & 0 \\ 0 & 0 & 0 & \varpi^{-3} & 0 \end{bmatrix} \quad (35)$$

where

-continued $$\varpi = \exp(-j2\pi/5) \quad (36)$$

Generally, $$F\gamma\gamma^H = \begin{cases} \omega^{-q(k-1)}, & (k-1)p \stackrel{\text{mod}M}{=} i-1 \\ 0, & (k-1)p \stackrel{\text{mod}M}{\neq} i-1 \end{cases} \quad (37)$$

Also since $$F\gamma^T F^H = (F\gamma\gamma^H)^H \quad (38)$$

then substituting together (35) into the LHS of (31), after mathematical manipulation, it follows that $$F\gamma\gamma^H \Lambda_\mu F\gamma^T F^H = \begin{bmatrix} 1 & 0 & 0 & 0 & 0 \\ 0 & \varpi^2 & 0 & 0 & 0 \\ 0 & 0 & \varpi^4 & 0 & 0 \\ 0 & 0 & 0 & \varpi^6 & 0 \\ 0 & 0 & 0 & 0 & \varpi^8 \end{bmatrix} \quad (39)$$

Generally, $$F\gamma\gamma^H \Lambda_\mu F\gamma^T F^H = \begin{bmatrix} 1 & 0 & \cdots & 0 \\ 0 & \omega^{p\mu} & \cdots & 0 \\ \vdots & \vdots & \vdots & \vdots \\ 0 & 0 & \cdots & \omega^{(M-1)p\mu} \end{bmatrix} \quad (40)$$

where p is the multiplicative inverse of p in the finite field of M.

The RHS of (40) is a diagonal matrix whose diagonal elements or (k,k)th component can be expressed as $\omega^{(M-1)p\mu}$. Combining (31), (34) and (40), it is possible to satisfy $\gamma T_\mu \gamma^T = T_{\mu+\nu}$, $\nu \neq 0$, $$(p-1)\mu \stackrel{\text{mod}M}{\neq} 0 \quad (41)$$

That is, (p−1) is relatively prime to M, where $$pp \stackrel{\text{mod}M}{=} 1.$$

The permuted sequences combination embodiments described herein sharpens the timing metric compared with the conventional correlation method. Analysis and simulation show that the permuted sequences combination method outperforms the previous frame synchronization schemes in AWGN channels and fading channels.

The foregoing description of exemplary embodiments has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for synchronizing a communication signal, wherein the communication signal has a frame structure and each frame of the frame structure includes at least one symbol, the method comprising:
    receiving at a receiver a first synchronization word from a modulator in a first sequence of a communication signal, the first synchronization word providing a reference symbol;
    receiving at the receiver a second synchronization word from the modulator in a second sequence of the communication signal, wherein the second synchronization word is a permutation of the first synchronization word, wherein the permutation of the first synchronization word comprises applying a permutation matrix to the first synchronization word, wherein the permutation matrix is a sparse matrix of order M having ones only at the i and the k components if $$(i-1)p + q \stackrel{\text{mod}M}{=} k-1,$$

where p and q are integers less than M.

2. The method of claim 1, wherein the reference symbol of the first synchronization word is a constant amplitude zero autocorrelation (CAZAC) sequence.

3. The method of claim 1, wherein the permutation matrix provides a symmetric permutation.

4. The method of claim 1, further comprising combining the received first and second synchronization words to perform sliding window processing such that peaks occur at correct frame starting points.

5. The method of claim 1, wherein the first and second synchronization words are appended to a frame starting point.

6. The method of claim 1, wherein the communication signal is provided in an additive white Gaussian noise (AWGN) channel.

7. An apparatus for synchronizing a communication signal having a frame structure using correlations between permuted sequences, the apparatus comprising:
    a modulator that provides a first synchronization word in a first sequence of a communication signal and a second synchronization word in a second sequence of the communication signal, wherein the second synchronization word is a permutation of the first synchronization word, wherein the permutation of the first synchronization word comprises applying a permutation matrix to the first synchronization word, wherein the permutation matrix is a sparse matrix of order M having ones only at the i and the k components if $$(i-1)p + q \stackrel{\text{mod}M}{=} k-1,$$

where p and q are integers less than M; and
    a transmitter that transmits the communication signal including the first and second synchronization words.

8. The apparatus of claim 7, wherein the permutation matrix provides a symmetric permutation.

9. A method of frame synchronization using permuted sequences, the method comprising:
    receiving a communication signal at a receiver, the communication signal including a frame structure with a first frame having a first communication word and a second frame having a second communication word;

applying a permutation to the first communication word from the received communication signal, wherein the permutation comprises applying a permutation matrix to the first communication word, wherein the permutation matrix is a sparse matrix of order M having ones only at the i and the k components if $$(i-1)p + q \stackrel{\mathrm{mod}\, M}{=} k - 1,$$

where p and q are integers less than M; and performing a correlation of the permuted first communication word and the second communication word.

10. The method of claim 9, wherein the second communication word is an interleaved version of the first communication word.

11. The method of claim 9, wherein the correlation of the first communication word and the second communication word provides sliding window processing for the communication signal received at the receiver.

* * * * *

UNITED STATES PATENT AND TRADEMARK OFFICE
CERTIFICATE OF CORRECTION

PATENT NO. : 8,126,103 B2  
APPLICATION NO. : 12/001463  
DATED : February 28, 2012  
INVENTOR(S) : Shi et al.

Page 1 of 1

It is certified that error appears in the above-identified patent and that said Letters Patent is hereby corrected as shown below:

Title page, item (56), under "Other Publications", in Column 2, Line 10, delete "Sychronization" and insert -- Synchronization --.

Page 2, item (56), under "Other Publications", in Column 1, Line 14, delete "High-Speed Speed Physical" and insert -- High-Speed Physical --.

Signed and Sealed this
Fourth Day of September, 2012

David J. Kappos  
*Director of the United States Patent and Trademark Office*